United States Patent [19]
Tago et al.

[11] Patent Number: 5,280,514
[45] Date of Patent: Jan. 18, 1994

[54] X-RAY PHOTOTAKING APPARATUS

[75] Inventors: Akira Tago, Tokyo; Haruhisa Madate, Yokohama; Masaaki Kobayashi, Kawasaki; Kazumasa Matsumoto; Yasuhiko Minakawa, both of Yokohama, all of Japan

[73] Assignee: Canon Kabushiki Kaisha, Tokyo, Japan

[21] Appl. No.: 965,853

[22] Filed: Oct. 23, 1992

[30] Foreign Application Priority Data

Oct. 30, 1991 [JP] Japan .................. 3-284961

[51] Int. Cl.$^5$ ............................. G03B 42/02
[52] U.S. Cl. .................... 378/187; 378/173; 378/174
[58] Field of Search ............. 378/187, 167, 172, 173, 378/174, 181, 182, 188, 114, 115, 116

[56] References Cited

U.S. PATENT DOCUMENTS

| | | | |
|---|---|---|---|
| 4,031,400 | 6/1977 | Hunt et al. | 378/173 |
| 4,282,439 | 8/1987 | Matsuura | 378/173 |
| 4,495,634 | 1/1985 | Suzuki | 378/173 |
| 4,597,097 | 6/1986 | Suzuki | 378/174 X |
| 4,984,260 | 1/1991 | Koyama | 378/173 |

FOREIGN PATENT DOCUMENTS 3-174531 7/1991 Japan .

*Primary Examiner*—David P. Porta
*Attorney, Agent, or Firm*—Fitzpatrick, Cella, Harper & Scinto

[57] ABSTRACT

An X-ray phototaking apparatus for effecting an X-ray phototaking operation on a sheet film, selected from plural kinds of sheet film in close contact, under a reduced pressure, with an intensifying member selected from of plural kinds of intensifying members, is provided with a device for detecting at least either the kind of the intensifying member and the kind of the sheet film, and a device for varying at least one of the contact time of the intensifying member and the sheet film, the X-ray irradiating conditions and the exposure control parameters, based on detection signals obtained from the detection.

10 Claims, 16 Drawing Sheets

X-RAY PHOTOTAKING APPARATUS

BACKGROUND OF THE INVENTION

1. Field of the Invention

The present invention relates to an X-ray phototaking apparatus for taking, an X-ray image of an object on a sheet film by utilizing radiation.

2. Related Background Art

FIG. 13 is a schematic view of a conventional X-ray phototaking system for X-ray phototaking of the chest or abdomen and the like of an object person, wherein shown are an X-ray source 101 including an X-ray tube; an object 102; an X-ray phototaking apparatus 103 for X-ray phototaking on an incorporated sheet film; and a rack 104 for supporting said apparatus.

FIG. 14 is an external view of the X-ray phototaking apparatus 103 shown in FIG. 13, wherein shown are a supply magazine 105 stocking unexposed sheet films; a receiving magazine 106 stocking exposed sheet films; and a chest plate 107 where the chest or abdomen and the like of the object person is to be contacted. Inside said chest plate there is provided a phototaking part, to which a sheet film is supplied from the supply magazine 105. On said phototaking part an intensifying screen is fixed for example by adhesion and the like. By X-ray irradiation while the sheet film is in close contact with the intensifying screen, the X-ray image of the object is formed on the sheet film. The exposed film is discharged from the phototaking part to the receiving magazine 106.

FIG. 15 shows an example of the internal structure of a conventional X-ray phototaking apparatus in a cross-sectional view. In a state shown in FIG. 15, a sheet film F has been fed to the phototaking part and has been brought into close contact with the intensifying screen. In the order from the X-ray source side, there are provided a chest plate 107 to which the body of the object is to be contacted; a grid 108 for eliminating scattered rays which are generated when X-rays pass through the body of the object and which deteriorate the image quality; a detector 109 of a phototimer, for detecting the intensity of the X-rays transmitted through the object and thereby controlling the irradiating time and the like of the X-rays for obtaining an appropriate exposure on the sheet film; and a front intensifying screen 111 and a back intensifying screen 112 each of which generates visible light in response to the X-rays and between which the sheet film F is sandwiched. The front intensifying screen 111 is fixed, for example by adhesion and the like, to a front support member 110, while the back intensifying screen 112 is likewise fixed to a back support member 113.

A sheet film separated by an unrepresented separating mechanism from the supply magazine 105 is supplied to the phototaking part through supply means including rollers 114, 115 and a guide plate 117 etc.

Feeding of the sheet film to the phototaking part, the back support member 113 and the back intensifying screen 112 are in a broken-line position. After the sheet film F is fed into a position between the front intensifying screen 111 and the back intensifying screen 112 in this state, the back support member 113 supporting the back intensifying screen 112 is moved toward a direction A by the rotation of a cam 118 and pressed to the front support member 110, whereby the sheet film F is tightly sandwiched between the front intensifying screen 111 and the back intensifying screen 112. The X-ray phototaking is conducted while the sheet film F is maintained in close contact with the intensifying screens 111 and 112 in the phototaking part. After said phototaking operation, the back support member 113 is moved opposite to the direction A to release the sheet film F from the contact with the intensifying screens 111 and 112, and the exposed sheet film F is stored in the receiving magazine 106.

The X-ray phototaking operation is generally conducted in the above-explained manner. It is desirable to provide a plurality of intensifying screens for converting the X-rays into the visible light which are different in sensitivity, light-emitting characteristics etc. and is suitably selected according to the position of the body of the object to be photographed. For example, an intensifying screen with a high sharpness and a wide latitude is used for the chest, while an intensifying screen of a high sensitivity is used for the abdomen. Also in the frontal chest radiography, so-called sensitivity-compensating intensifying screen, having a lower sensitivity in the areas corresponding to lung lobes is sometimes used, because the X-ray transmission is higher in the lung lobe regions than in the mediastinum at the center of the body. As an example of such X-ray phototaking apparatus employing some kinds of intensifying screens, the Japanese Patent Laid-open Application No. 3-174531 disclosed a phototaking apparatus which incorporates three kinds of intensifying screens and is provided with a so-called screen changer, a mechanism for selectively setting one of three kinds of intensifying screens in the phototaking part.

However, in the conventional radiographic phototaking apparatus in which a kind and a set of front and back intensifying screens is fixed in the phototaking part, it has been unable to select, in a single phototaking apparatus, optimum intensifying screens according to the part of the body to be photographed such as chest, abdomen or waist and the like, the front or lateral image taking even for a same part of the body, the age or the physique of the object person, or the purpose of inspection such as precision inspection or group inspection. Therefore, for selecting optimum intensifying screens in order to obtain X-ray images matching the different objectives, it has been necessary to employ plural X-ray phototaking apparatuses, or to effect phototaking operation utilizing plural cassettes respectively incorporating intensifying screens of different characteristics.

On the other hand, the phototaking apparatus with the above-explained screen changer inevitably becomes bigger and heavier because of the mechanism for intensifying screen exchange. For this reason there is required a wide X-ray room, and such apparatus has been unsuitable for a limited space such as the wagon for the X-ray phototaking used for group inspection. Also such phototaking apparatus can only incorporate a limited number of intensifying screens, so that it has not necessarily been possible to select the optimum intensifying screen matching the desired phototaking conditions.

SUMMARY OF THE INVENTION

In consideration of the foregoing, the object of the present invention is to provide an X-ray phototaking apparatus capable of realizing different systems flexibly matching various purposes such as:

A group inspection with standard image quality and with a reduced radiation dose;

close inspection, with a high radiation dose but with a high image quality;

compensating for sensitivity, capable of taking the photo images of both the lung lobe regions and the mediastinum.

The above-mentioned object can be attained, according to an aspect of the present invention, by an X-ray phototaking apparatus capable of effecting an X-ray phototaking operation by maintaining a sheet film, selected from some kinds of sheet films, in close contact by reducing pressure with an intensifying member selected from some kinds of intensifying members of comprising means for detecting at least either of the kind of said intensifying members or the kind of said sheet films, and means for varying at least any one of the contact time of attaching said intensifying member to said sheet film, X-ray irradiating condition and exposure condition, according to a detection signal obtained by said detection.

DETAILED DESCRIPTION OF THE PREFERRED EMBODIMENTS

Figure 1:
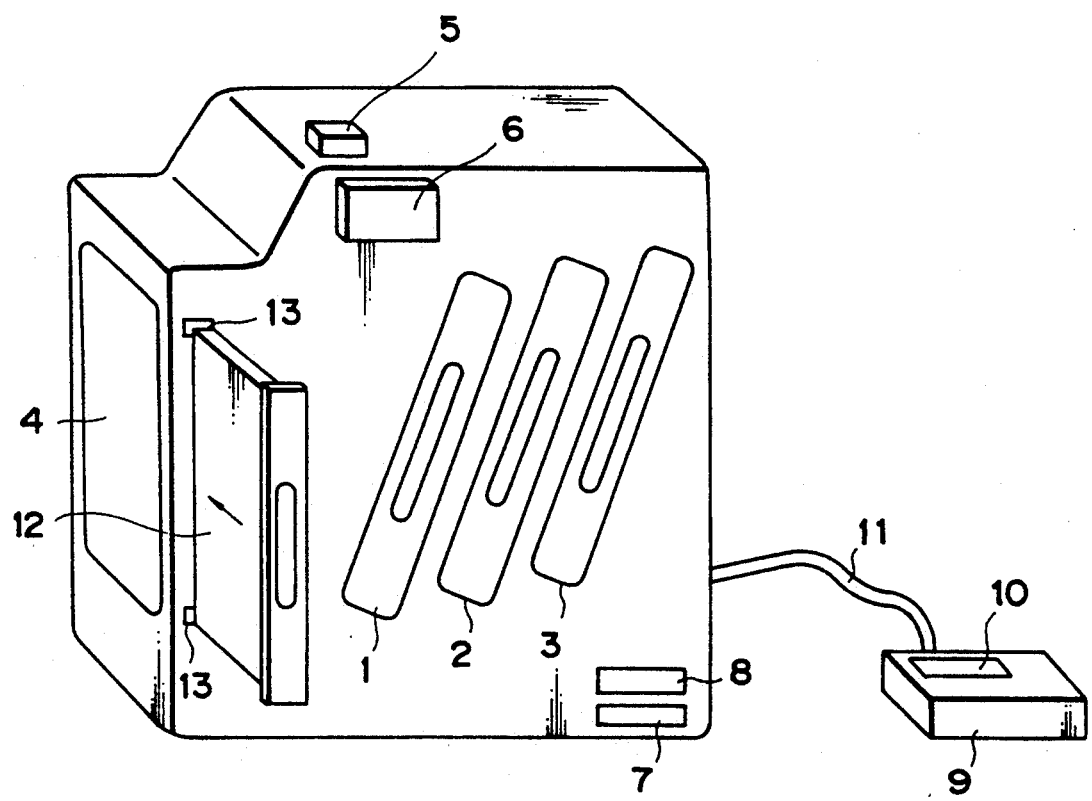
FIG. 1 is a perspective view of an X-ray phototaking apparatus embodying the present invention.

Now the present invention will be explained in detail by embodiments thereof shown in the attached drawings. FIG. 1 is an external perspective view of an embodiment of the X-ray phototaking apparatus of the present invention, wherein supply magazines 1 and 2 respectively incorporate stacked unexposed sheet films different in size or in the characteristics. Instead of the magazine type in the present embodiment, a tray-type for stacking the unexposed sheet films may be used. There are also shown a receiving magazine 3 for housing a stack of exposed sheet films; a chest plate 4 to which the body of the object person is to be contacted; an indicator lamp 5 for indicating the operation status of the X-ray phototaking apparatus; an ID information recording unit 6 for recording the ID information, such as the name of the object person, on part of the exposed sheet film; signal output terminals 7 for varying the set values of the voltage and current an X-ray tube, defining the irradiating conditions of an X-ray generating apparatus; signal output terminals 8 for varying the set parameters of an automatic exposure control device; an operation unit 9 provided with a display unit 10, for controlling the phototaking apparatus; a cable 11 for connecting the operation unit 9 with the X-ray phototaking apparatus; a detachable unit 12 incorporating an intensifying screen, constituting an intensifying member for generating visible light in response to X-rays and detachably mountable in a phototaking part of the apparatus; and a guide 13 for mounting the detachable unit 12 into the phototaking part.

Figure 2:
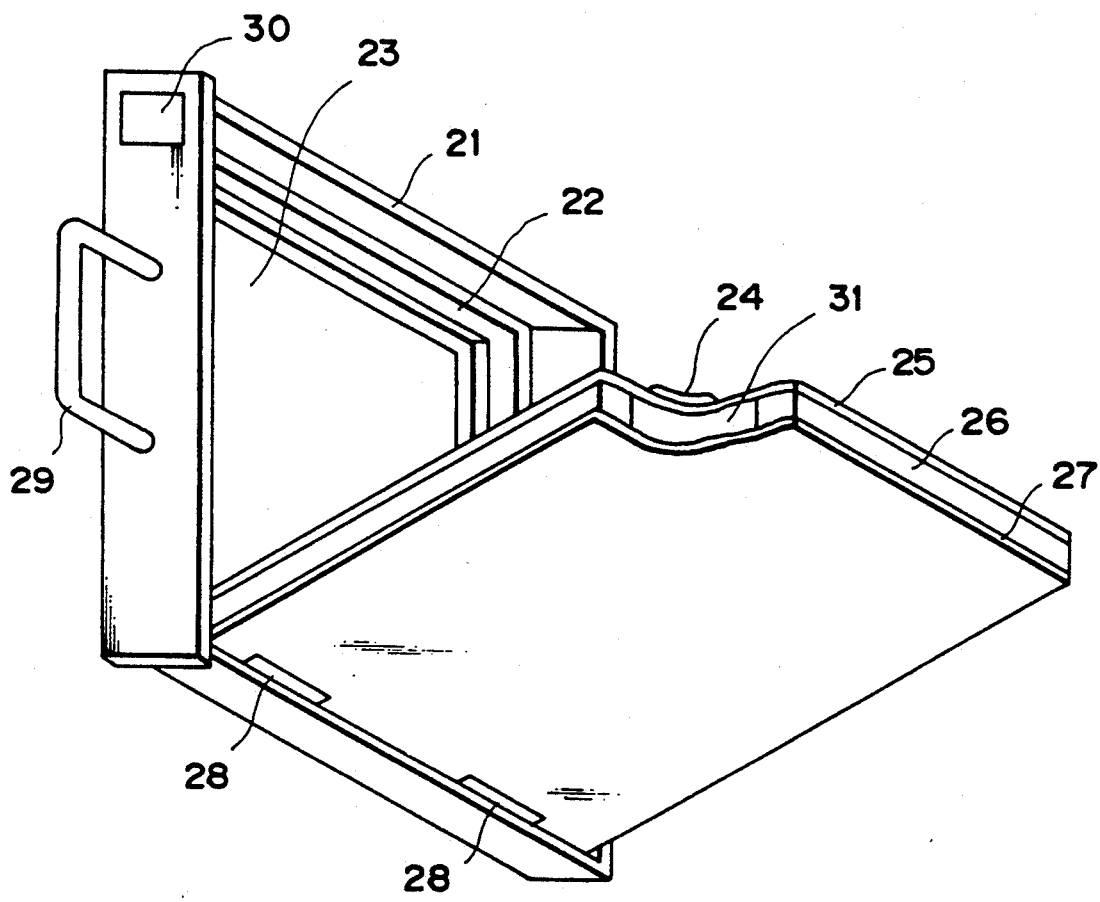
FIG. 2 is a perspective view of a contacting unit.

FIG. 2 is a perspective view showing the structure of the detachable unit 12. On a front support member 21, there are mounted, for example by adhesion and the like, a flexible and hermetic packing 22 and a front intensifying screen 23. A back intensifying screen 24 is mounted on a flexible plate-shaped back support member 25, fixed on a frame member 26 which is in turn mounted on an air-permeable cover 27, openably and shuttably rendered about hinges 28. There are also shown a grip 29, a label 30 for indicating the name of the intensifying screen etc., and a space 31.

Figure 3:
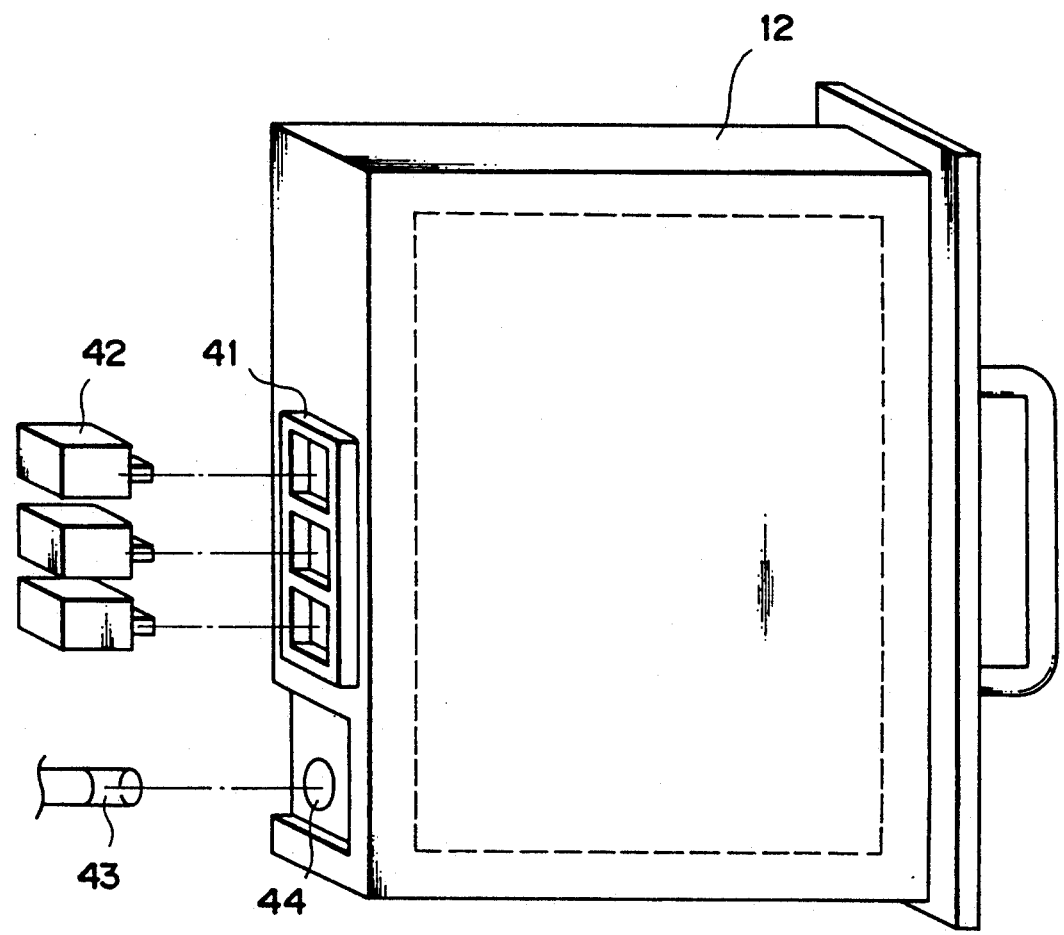
FIG. 3 is a view showing an example of the method for detecting what kind of contacting unit it is.

FIG. 3 shows an example of the method for detecting the kind of the detachable unit. The unit is prepared in plural kinds, respectively bearing intensifying screens different in the characteristics or in the size for different purposes of phototaking, and a suitably selected one is mounted on the main body of the phototaking apparatus. On the lateral face of each detachable unit 12, there is provided an identifying member 41 for indicating the kind of unit, and detecting means 42, for detecting the kind of detachable unit 12 provided with the main body of the phototaking apparatus. More specifically there is preferably employed a mechanical detecting mechanism such as a microswitch, or an optical or magnetic detecting mechanism. Also provided is connector means, for connecting the detachable unit 12 with pressure reducing means, such as a vacuum pump provided within the main body when the detachable unit is mounted, in order to reduce the pressure therein bringing the sheet film into close contact with the intensifying screens More specifically, said connector means is composed of a nipple 43 provided in the main body of the phototaking apparatus, and a connecting hole 44 provided on the detachable unit 12 and adapted to be hermetically connected with said nipple 43 when said unit 12 is mounted.

Figure 4:
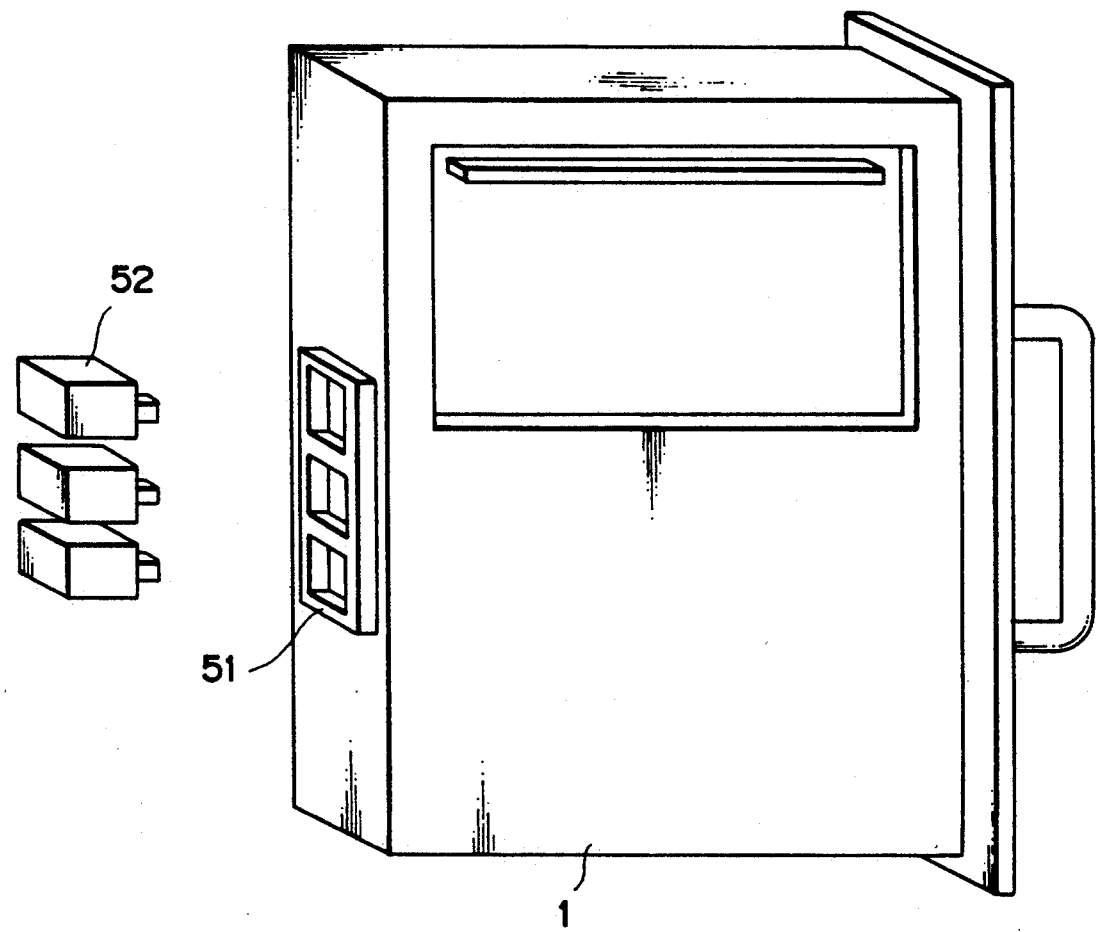
FIG. 4 is a view showing an example of detecting what kind of sheet film is in a magazine.

FIG. 4 shows an example of the method for detecting the kind of sheet films stacked in the supply magazine 1. The supply magazine is prepared in plural kinds, corresponding to the number of kinds of sheet films, and, on each lateral face of each supply magazine, there is provided an identifying member 51 for indicating the kind of magazine. Upon mounting of the supply magazine 1 on the main body of the phototaking apparatus, detection means 52 provided with a similar detecting mechanism as shown in FIG. 3 detects the identifying member 51 provided on the supply magazine, thereby identifying the kind or size of the sheet films stored in the supply magazine.

Figure 5:
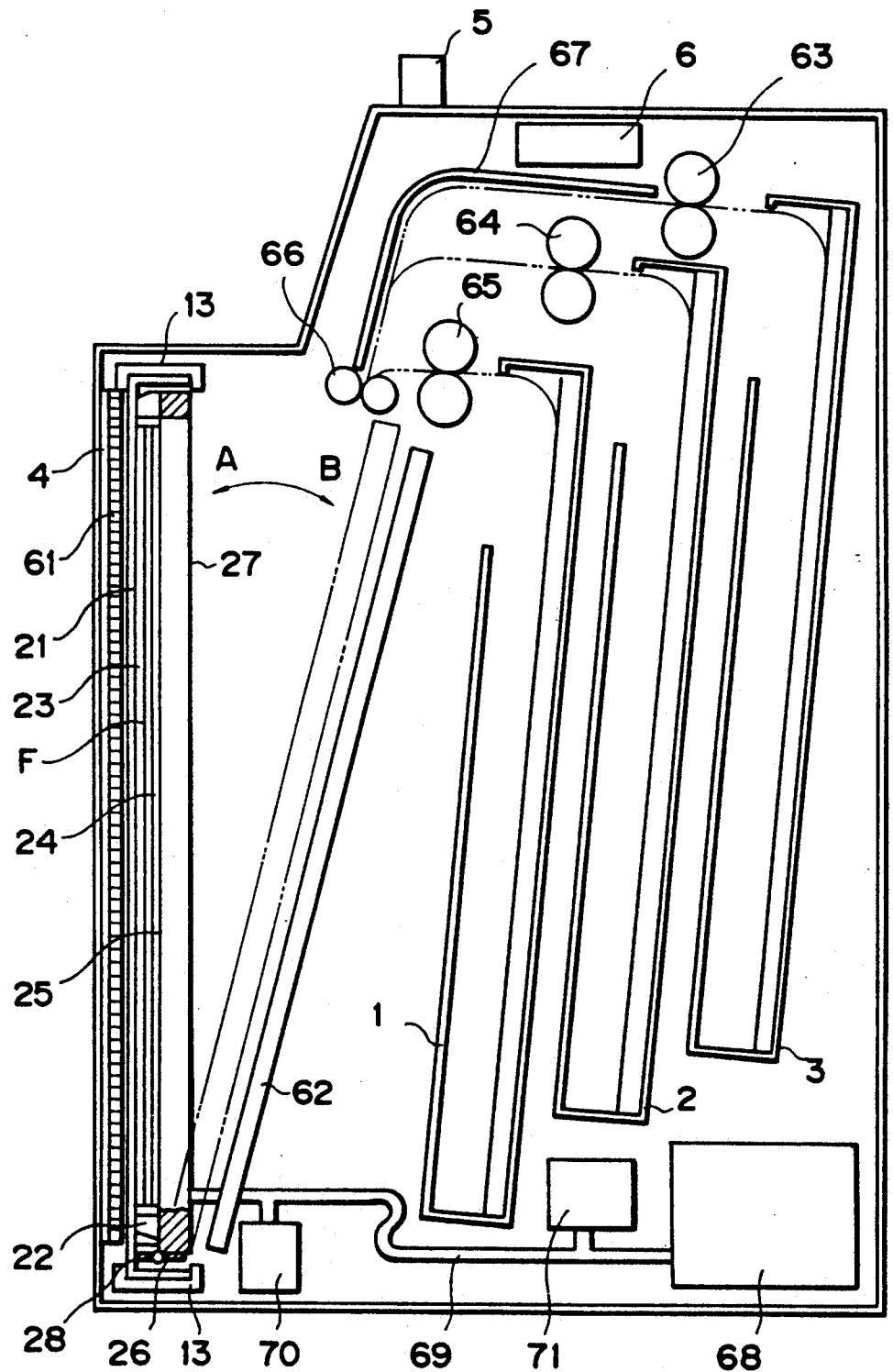
FIG. 5 is a view showing the internal structure of an X-ray phototaking apparatus embodying the present invention.

FIG. 5 is a cross-sectional view of the X-ray phototaking apparatus, equipped with the detachable unit 12 and the supply magazines 1, 2 explained in FIGS. 2 to 4. In FIG. 5 there are shown a chest plate 4, and a grid 61 for eliminating the scattered rays generated by the object person upon passing of the X-rays therethrough and deteriorating the image quality. The grid is positioned between the chest plate 4 and the detachable unit. In the present embodiment, said grid 61 is fixed on the main body of the phototaking apparatus, and, in such case, there is preferably used a grid with a high grating density, in order to avoid standing out of the pattern of the lead foil constituting said grid. In case of using a moving grid in order to extinguish the pattern of the lead foil, it is desirable to employ each different moving speed grid for the chest phototaking and the abdomen phototaking, and, for this purpose, there are also preferably provided identifying means in the grid and means for varying the moving speed of the grid, based on the detection signal from said identifying means.

An X-ray detector 62 is provided for an automatic exposure control device (for example, a phototimer) for obtaining an appropriate image density on the film, by detecting the intensity of X-rays transmitted through the object person and the detachable unit. Said detector 62 has plural detecting areas of predetermined shapes, as will be explained later. In the present embodiment, the detector is positioned behind the detachable unit, in order to reduce the geometrical image blue by shortening the distance between the object person and the sheet film and to protect the background fog caused by the scattered rays from the detector. The automatic exposure control device attains an appropriate exposure on the film, by controlling the exposure time based on the output of said detector. A part of the detachable unit moves to a position A at the phototaking operation, and to a position B at the feeding and discharge of the sheet film. The detector 62 is fixed in an inclined state, in order to avoid interference when the detachable unit is moved to the position B, but it may also be so constructed as to move between the positions A and B, together with the movable part of the detachable unit. The unexposed sheet films are stacked in the supply magazines 1, 2 while exposed ones are stacked in a receiving magazine 3. Paired rollers 63, 64, 65, 66 and a guide plate 67 are provided as transport means for feeding the unexposed sheet film to the phototaking part and discharging the exposed film therefrom. A vacuum pump 68 serves to reduce the pressure within the detachable unit, in order to bring the unexposed sheet film supplied from the supply magazine 1 or 2, in contact with the intensifying screens in the detachable unit. The vacuum pump 68 and the detachable unit 12 are connected by way of a pipe 69. Also provided are a pressure sensor 70 for detecting the pressure within the detachable unit, and a valve 71 for releasing the pipe to the atmospheric pressure, in order to release the contact between the sheet film and the intensifying screens after the phototaking operation.

In the following there will be explained the functions of the apparatus shown in FIGS. 1 to 5. In the X-ray phototaking, the phototaking operation is conducted in various modes according to the intended objective, for example whether the object person is a child or an adult, whether the object is for precision inspection or group inspection, whether the desired part is chest or abdomen or whether a front or lateral image is desired even for a same part of the body etc. In such phototaking operations, there is required a system matching the objective such as improving the resolving power in the precise inspection than in the group inspection, or of adopting a higher sensitivity in the abdominal radiograph than in the chest radiograph. For this purpose, it is at first necessary to select a intensifying screen of a size, a sensitivity or light emitting characteristics etc. matching the objective. Thus there is selected an optimum unit from plural detachable units respectively containing intensifying screens different in characteristics or size, and the selected detachable unit 12 is inserted therein along a guide member 13. The inserted detachable unit 12 is fixed to the main body by an unrepresented locking mechanism. In this state the detecting means 42 of the phototaking apparatus detects the identifying member 41 of the detachable unit 12 as shown in FIG. 3, thereby identifying the intensifying screens 23, 24 provided with the detachable unit 12. Also the connecting hole 44 of the unit 12 is connected to the nipple 43 of the phototaking apparatus, in order to contact the sheet film F with the intensifying screens 23, 24 of the detachable unit 12 under a reduced pressure.

Similarly the supply magazines 1, 2 are mounted on the main body. Within the magazines 1, 2 respectively are piled films of different sizes, or same-sized films of different characteristics such as sensitivity or contrast. The size and kind of the sheet films piled within the supply magazines 1, 2 are identified by the detection of the identifying members 51 of the supply magazines 1, 2 by the detecting means 52 of the main body. The size and kind of the intensifying screens 23, 24 and those of the sheet films F are displayed on a display unit 10, composed for example of a liquid crystal display unit and the like, of the operation unit 9 shown in FIG. 1.

At the feeding of the sheet film F into a position between the intensifying screens 23 and 24, the rear support member 25 of the detachable unit 12 and the detector 62 wait in the double-dotted chain-lined position B. A sheet film matching the intensifying screens 23, 24 of the detachable unit 12 is automatically selected, based on the detection signal of the detection means 42, indicating the kind of detachable unit 12, and the detection signal of the detection means 52, indicating the size and kind of the sheet film. If the loaded supply magazines 1, 2 are not piled with the sheet film matching the intensifying screens 23, 24, a message is displayed on the display unit 10 of the operation unit 9, for requesting the operator to replace the supply magazine with one piled with sheet films matching the characteristics of the intensifying screens 23, 24 of the detachable unit. Then the kind of sheet films piled in the replaced magazine is detected anew in the same manner, and there is discriminated whether the sheet films match the intensifying screens 23, 24. If the films match the screen 23, 24, a sheet film is extracted from the supply magazine by the unrepresented separating mechanism, and is fed, by the transport means composed of the paired rollers 64, 65, 66 and guide plate 67 and the like, to a position in front of the back intensifying screen 24 in the detachable unit. The sheet film thus fed is maintained in a predetermined position, by an unrepresented support mechanism, which is provided for preventing displacement of the sheet film downward in the vertical direction by gravity.

Then the back support member 25 is rotated in a direction A by an unrepresented rotating mechanism, whereby the back support member 25 comes into close contact with a packing 22, thus defining an enclosed space surrounded by the front support member 21, packing 22 and back support member 25 and piling the sheet film F therein. When the pressure in the enclosed space is reduced by the vacuum pump 68 connected by way of the pipe 69, the flexible back support member 25 is bent toward the front support member 21 by the atmospheric pressure, whereby the sheet film F is maintained in close contact with the front and back intensifying screens 23, 24.

After close contact is completed in this manner, the X-ray phototaking operation is conducted as will be explained later in more details. After the phototaking operation, the valve 71 is opened to the atmospheric pressure to release the contact between the sheet film and the intensifying screens in the detachable unit, and the back support member 25 is rotated in the direction B shown in FIG. 5 to the chain-lined position. Then the sheet film F on the back intensifying screen 24 is transported toward the receiving magazine 3 by the paired rollers 66, 63 and the guide plate 67 and the like, and, when the exposed sheet film reaches a predetermined position, the ID information recording unit 6 records the name of the object person, irradiating condition of the X-ray generating apparatus, kind of used intensifying screen etc. in a part of said sheet film. In order to obtain a constant recording density regardless of the sensitivity of the sheet film, there is provided means for varying the light emitting time or intensity of the recording unit, based on the detection signal indicating the kind of sheet film.

The X-ray phototaking apparatus of the present embodiment is capable of flexibly attaining various phototaking objectives by modifying the kind of parameters according to the phototaking conditions, as will be explained in the following.

(1) Setting of contact time

In the apparatus of the present embodiment, for obtaining an X-ray image of high image quality, there is adopted a so-called vacuum contact method in which an enclosed space including the intensifying screens and the sheet film is evacuated to achieve uniform close contact therebetween. Referring to FIG. 5, the contact of the sheet film and the front intensifying screen 23 and the back intensifying screen 24 is achieved by the removal of air layers therebetween, and the time required therefor depends on the surface characteristics such as the surface roughness of the intensifying screens, surface forms of the front and back support members 21, 25, and size and surface characteristics of the sheet film. Consequently, the minimum time required from the start of vacuum drawdown to the completion of uniform contact over all the surface varies depending on the combination of the intensifying screens and the sheet film. For example, intensifying screens with coarse surface are suitable for group inspection for effecting phototaking operations in succession for a large number of object persons, because the contact of the intensifying screens and the sheet film is completed within a short time, but the image quality becomes worse because of the coarse surface of the intensifying screen. On the other hand, intensifying screens with smoother surfaces for improved image quality requires a longer vacuum drawdown time. Consequently, in the case of such intensifying screens with smoother surfaces, it is necessary to prolong the vacuum drawdown time or to regulate the suction pressure of the vacuum pump 68.

Figure 6:
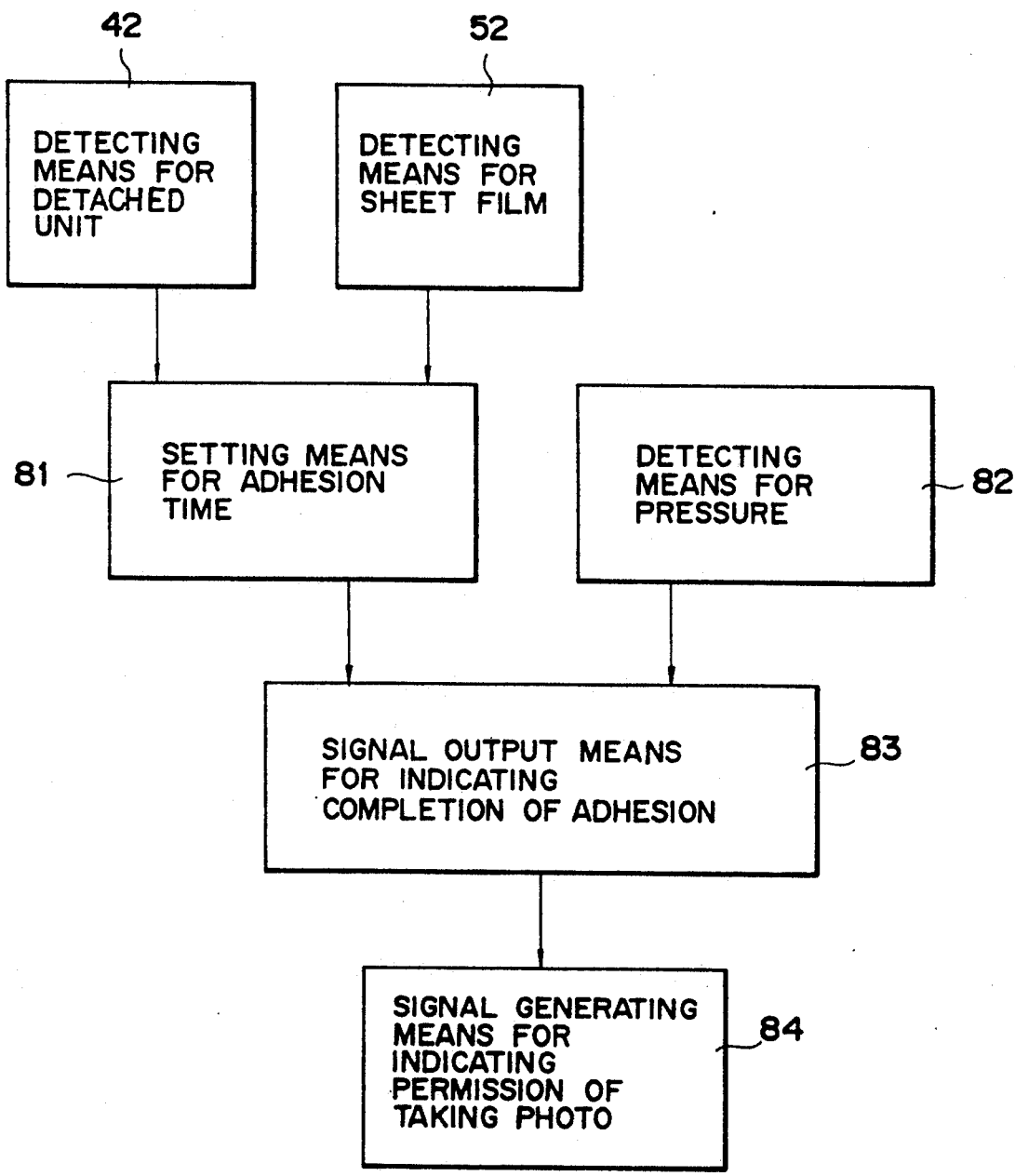
FIG. 6 is a flow chart for setting the timing of an adhesion completion signal.
Figure 7:
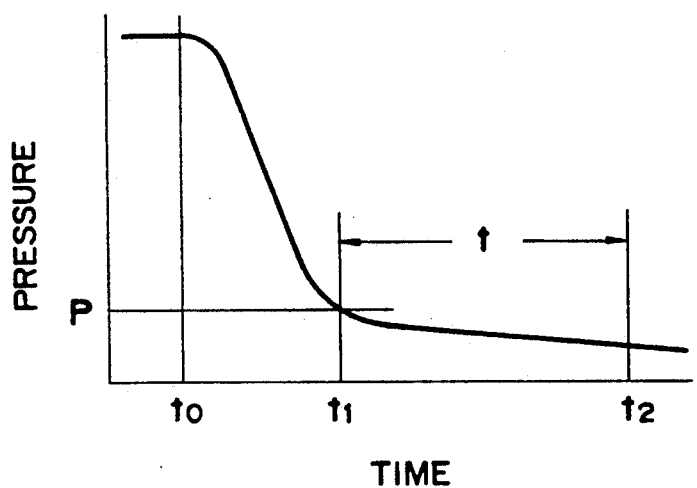
FIG. 7 is a chart showing the pressure change in the contacting unit.

Now reference is made to FIGS. 6 and 7 for explaining the method for regulating the contact time or the period time until releasing the output of a contact completion signal. Referring to FIG. 6, the detection means 42 for detecting the kind of detachable unit mounted on the main body and the detection means 52 for detecting the kind of sheet film respectively detect the kinds of the intensifying screens and the sheet film. Based on the data of thus obtained detection signals, contact time setting means 81 determines an optimum contact time corresponding to the combination of the intensifying screens and the sheet film. The explanation will be concretely started as follows. FIG. 7 is a chart showing the pressure as a function of tile, when the vacuum pump 68 is activated to reduce the pressure of the enclosed space within the detachable unit 12 for contacting the sheet film with the intensifying screens 23, 24, wherein $t_0$ indicates the time of starting operation of the vacuum pump 68, $t_1$ is the time when the pressure in the detachable unit 12 reaches a predetermined reference pressure P, and $t_2$ is the time of completion of contact. As shown in FIG. 7, when reducing pressure of the enclosed space is started by the vacuum pump 68, the pressure drops rapidly to the reference pressure P, and then is gradually lowered. The time t from $t_1$ to $t_2$ ($t = t_2 - t_1$) corresponds to the aforementioned optimum contact time, which is determined by the contact time setting means 81 according to the combination of the intensifying screens and the sheet film. More specifically, said optimum contact time is prepared for a data table, which in advance stores various optimum contact times corresponding to various combinations.

Again referring to FIG. 6, starting reducing pressure by a vacuum pump 68 the pressure value obtained by pressure detection means 82, composed for example of a pressure sensor, varies as shown in FIG. 7. After the predetermined reference pressure P is detected, and the time t set passes according to the combination of the intensifying screens and the sheet film as explained above, contact completion signal generating means 83 generates a contact completion signal, whereupon phototaking permission signal generating means 84 generates a phototaking permission signal. In response the indicator lamp provided with the main body of the phototaking apparatus is turned on to inform the operator of the enabled state for phototaking operation.

(2) Setting of X-ray exposure condition

The X-ray phototaking operation is executed after the intensifying sheets 23, 24 are contacted with the sheet film as explained above. The irradiating condition of the X-ray generating apparatus at the phototaking operation is variable depending on the part and positioning of the body to be photographed, and the intensifying screen to be employed. For example, for the chest, there is conducted so-called high-voltage phototaking with X-ray of high transmissive ability in order to effect diagnosis even in the tissues covered by the scapulas or the costas, and the voltage for the X-ray generating apparatus in this state is selected at 120-140 kVp. On the other hand, for the commercially available wide latitude films for chest radiograph, the appropriate X-ray tube voltage is in a range of 90-100 kVp. In the abdominal radiograph, the X-ray tube voltage is selected at about 100 kVp because of abundance of soft tissues such as internal organs, though the bone tissues in the stomach are less than that in the chest. Thus the tube voltage and the tube current, defining the irradiating conditions of the X-ray emitted from an X-ray source 101, have to be varied to match the intensifying screens and the sheet film, depending on the purpose of diagnosis and on the part to be photographed.

Figure 8:
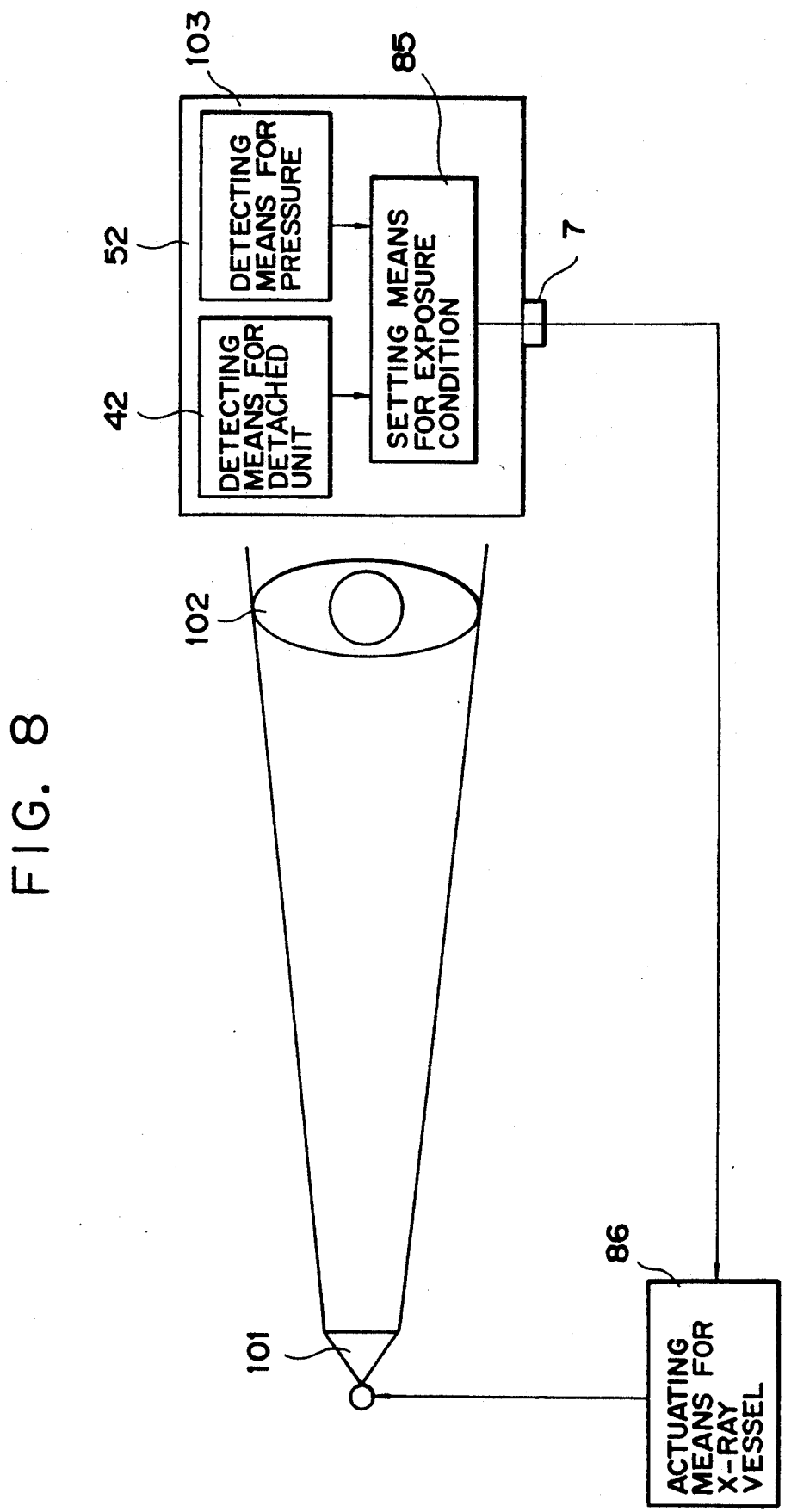
FIG. 8 is a view for explaining the setting of X-ray irradiating conditions for an X-ray generating apparatus.

In the following there will be explained, with reference to FIG. 8, the method for effecting the X-ray phototaking operation under irradiating optimum conditions for the combination of the intensifying screens and the sheet film. The detection means 42 detects the identifying member 41 of the detachable unit 12 mounted on the main body, thereby identifying the kind of the intensifying screens 23, 24 in said detachable unit 12. Also the detection means 52 detects the identifying member 51 of the supply magazine, thereby identifying the sheet film matching the intensifying screens in the phototaking part. Based on both detection signals, the exposure condition setting means 85 sets the optimum tube voltage and tube current for the X-ray tube for the combination of the intensifying screens and the sheet film, and releases a corresponding signal from the signal output terminals 7. Said terminals are connected to X-ray tube actuating means 86, and, based on the signals from the output terminals 7, the voltage and current for driving the X-ray tube 101 are regulated according to the combination of the intensifying screens and the film.

(3) Exposure condition setting I

In the following there will be explained the method of setting the exposure condition by varying various control parameters in the automatic exposure controlled phototaking.

In the X-ray phototaking operation utilizing an automatic exposure control device for controlling the exposure time in order to maintain an appropriate image density on the film as in the present embodiment, a signal indicating the irradiation dose, outputted from the detector of the automatic exposure control device is compared with a predetermined reference value, and the X-ray irradiation is terminated when said signal exceeds said reference value. However, the irradiation dose becomes different when the kind of intensifying screens are changed to also change the sensitivity. In the present embodiment, therefore, the reference value is varied according to the kind of the intensifying screens.

In the following, there will be explained a case of varying the parameters of the automatic exposure control device in response to a change from a detachable unit containing the intensifying screens having standard sensitivity to another unit containing screens of higher resolving power and lower sensitivity, for the purpose of precision diagnosis. It is assumed that the standard intensifying screens have a relative sensitivity of 1 and an X-ray absorbance of 60%, while the screens of higher resolving power and lower sensitivity have a relative sensitivity of $\frac{1}{3}$ and an X-ray absorbance of 20% of the standard screens. It is also assumed that the voltage and the current for the X-ray tube are constant.

Figure 9A:
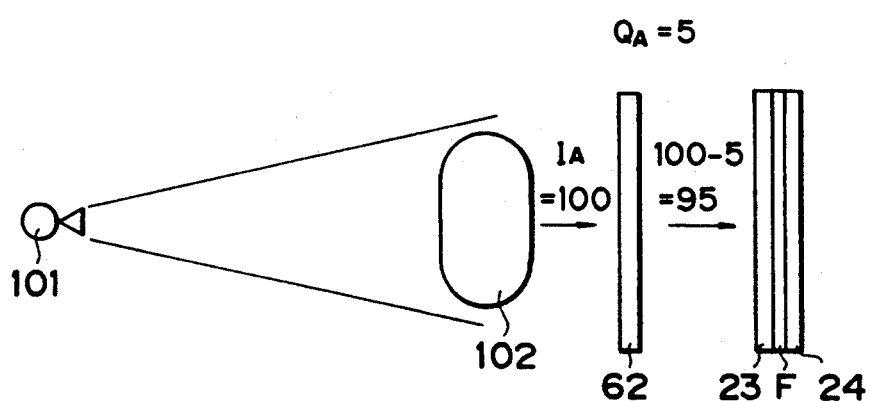
FIGS. 9A to 9D are views showing the variation in the set reference values of an automatic exposure control device.
Figure 9B:
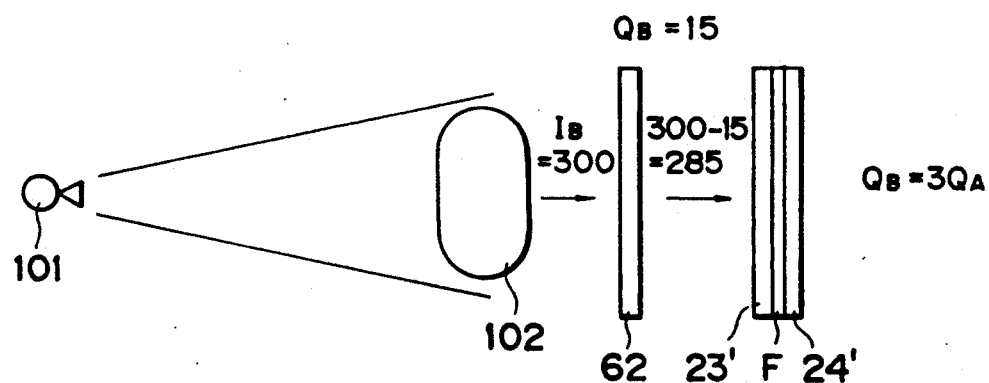
Figure 9C:
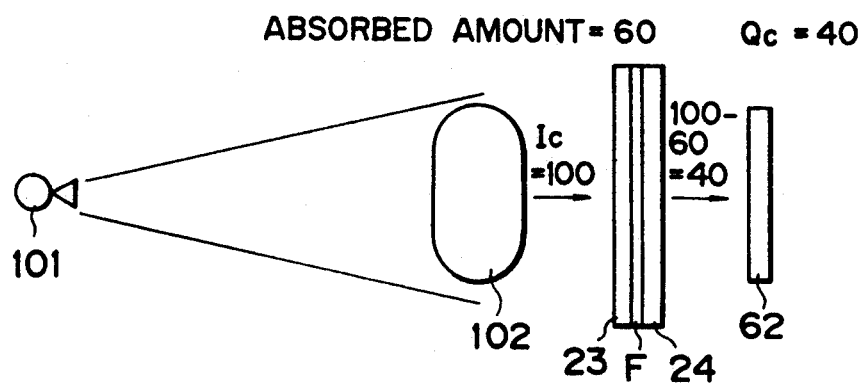
Figure 9D:
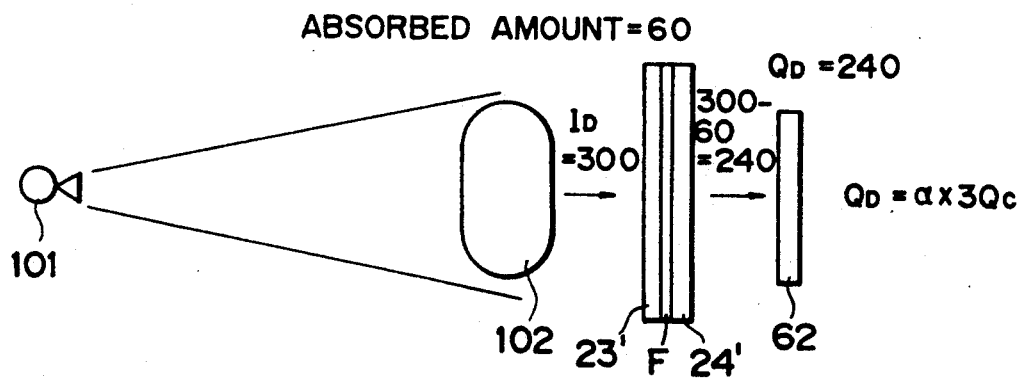

There will at first be explained, for comparison, a conventional configuration in which the detector of the automatic exposure control device is positioned between the object person and the intensifying screen, as shown in FIGS. 9A and 9B, and then explained is the case in which the detector is positioned behind the intensifying screens, namely behind the detachable unit as in the present embodiment and as shown in FIGS. 9C and 9D.

FIG. 9A shows the X-ray dose to the detector 62 and the predetermined reference value in case of phototaking operation with a detachable unit containing intensifying screens 23, 24 of a standard sensitivity, while FIG. 9B shows those in case of phototaking operation with intensifying screens of a higher resolving power and a low sensitivity of $\frac{1}{3}$ of said standard sensitivity. In FIG. 9A, X-ray of a dose required for obtaining an appropriate density on the film is directed from the X-ray tube 101 to the object person 102, and the X-ray dose after passing through the object is taken as $I_A=100$. The X-ray $I_A$ transmitted by the object person is at first subjected, in the detector 62, to an absorption of 5%, or $(5/100) \times I_A = 5$, and the remaining dose of 95% or $(95/100) \times I_A = 95$ reaches the intensifying screens 23, 24 and is subjected thereinto an absorption of 60% or $95 \times (60/100) = 57$ for exposing the film to obtain the appropriate image density thereon. In this case a reference value $Q_A = 5$ is set on the automatic exposure control device, so that the X-ray irradiation is terminated when the detector 62 detects an X-ray dose by the condition of $Q_A = 5$.

In case of FIG. 9B, because the film sensitivity is $\frac{1}{3}$, the X-ray dose required for obtaining an appropriate image density is $I_B = 3 \times I_A = 300$. In this case the X-ray $I_B$ transmitted by the object person is subjected, in the detector 62, to an absorption of 5% or $(5/100) \times I_B = 15$, and the remaining dose of 95% or $(95/100) \times I_B = 285$ reaches the intensifying screens 23', 24' and is subjected therein to an absorption of 20% or $285 \times (20/100) = 57$ for obtaining an appropriate density on the film. In this case a reference value of the condition of $Q_B = 15 = 3Q_A$ is set on the automatic exposure control device, and the X-ray irradiation is terminated when the detector 62 detects an X-ray dose equal to $Q_B(=15=3Q_A)$. The states of the cases shown in FIGS. 9A and 9B are summarized in Table 1.

TABLE 1

| Intensifying screen | Standard | High resolution Low sensitivity |
|---|---|---|
| Sensitivity Ratio | 1 | $\frac{1}{3}$ |
| X-ray dose transmitted by object | $I_A = 100$ | $I_B = 300$ |
| X-ray dose absorbed by detector (reference value) | $Q_A = 5$ | $Q_B = 15 = 3Q_A$ |
| Irradiating time | T | 3T |
| X-ray dose absorbed by intensifying screen (exposure to film) | 57 | 57 |

Thus, when the detector of the automatic exposure control device is positioned between the object person and the intensifying screen, the following relationship stands between the reference value to be modified and sensitivity ratio:

$$Q_B = (1/\text{sensitivity ratio}) \times Q_A \qquad (a)$$

Consequently, in case the sensitivity of the intensifying screen is varied, the reference value of the automatic exposure control device has to be modified to a value multiplied by the reciprocal of the sensitivity ratio.

In the following there will be explained a case in which the detector is positioned behind the intensifying screens. FIG. 9C shows the X-ray dose received by the detector 62 and the predetermined reference value in case of a phototaking operation with a detachable unit containing intensifying screens 23, 24 of a standard sensitivity, while FIG. 9D shows those with intensifying screens 23', 24' of higher resolving power and lower sensitivity equal to ⅓ of the standard sensitivity In case of FIG. 9C, X-ray required for obtaining an appropriate density on the film is directed from the X-ray tube 101 to the object person 102, and the X-ray dose after passing through the object is taken as $I_C=100$. The X-rays transmitted through the object person 102 is subjected in the screens 23, 24 to an absorption of 60% or $(60/100) \times I_C=40$ is the remaining dose of 40% or $(40/100) \times I_C 40$ is detected by the detector 62. In this case a reference value $Q_C=40$ is set in the automatic exposure control device, and the X-ray irradiation is terminated when the detector 62 detects a dose equal to $Q_C=40$.

In case of FIG. 9D, where the film sensitivity is ⅓, the X-ray dose required for obtaining an appropriate image density becomes $I_D=3 \times I_C=300$. X-ray transmitted through the object person is subjected in the intensifying screens 23', 24' to an absorption of 20% or $(20/100) \times I_D=60$, and the remaining dose of 80% or $(80/100) \times I_C=240$ is detected by the detector 62. In this case, a reference value $Q_D=240$ is set in the automatic exposure control device, and the X-ray irradiation is terminated when the detector 62 detects a dose equal to $Q_D=240$. These states are summarized in Table 2.

TABLE 2

| Intensifying screens | Standard | High resolution Low sensitivity |
|---|---|---|
| Sensitivity Ratio | 1 | ⅓ |
| X-ray dose transmitted by object | $I_C = 100$ | $I_D = 300 = 3I_C$ |
| X-ray dose absorbed by screens | 60 | 60 |
| X-ray dose received by detector (reference value) | $Q_C = 40$ | $Q_D = 240$ |
| Irradiating time | T | 3T |

Thus, in case the detector of the automatic exposure control device is positioned behind the intensifying screens, the following relationship stands between the reference value to be modified and the sensitivity ratio.

$$Q_D \alpha \times (1/sensitivity\ ratio) \times Q_C \quad (b)$$

where α is a correction coefficient. Consequently, in case the sensitivity of the intensifying screen is varied, the reference value of the automatic exposure control device has to be modified to a value multiplied by the reciprocal of the sensitivity ratio and the correction coefficient.

As explained in the foregoing, when the sensitivity of the intensifying screen is varied, it becomes necessary to modify the reference value of the automatic exposure control device. When the detector is positioned between the object person and the intensifying screen, the reference value is to be multiplied by the reciprocal of the sensitivity ratio as represented by the equation (a). Also when the detector is positioned behind the intensifying screens as in the present embodiment, the reference value is to be multiplied by the reciprocal of the sensitivity ratio and the correction coefficient, as represented by the equation (b), since the X-ray dose absorbed by the intensifying screens is different corresponding the sensitivity.

(4) Exposure condition setting 2

Figure 11:
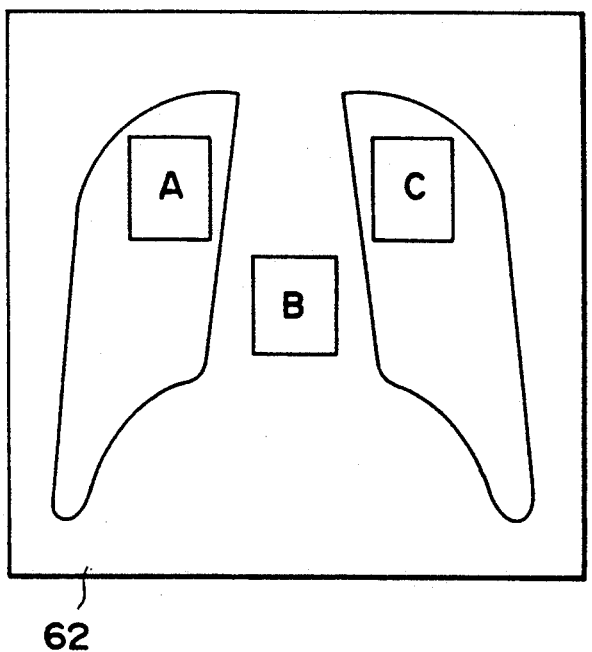
FIG. 11 is a view showing exposure areas in chest radiograph.

As the structure of the human body is complex, the image quality of an X-ray is influenced by the position and shape of the detection areas (X-ray receiving areas) depending on the objective of phototaking. Consequently the present embodiment employs a so-called multi-area method in which outputs from plural independent X-ray receiving areas are processed by each circuit, and the outputs are suitably selected or weighted according to a change in the photographed position of the object body, as will be explained in the following in more details. FIG. 11 shows the detector 62 of the automatic exposure control device. The detector 62 has three independent X-ray receiving areas A, B and C, of which A and C detect the X-ray dose transmitted by the lung lobes of the object while B detects the X-ray dose transmitted through the mediastinum.

In case of taking a front chest image with ordinary intensifying screens, the automatic exposure control is conducted on the X-ray doses detected in all the areas A, B and C. On the other hand, in case of taking a lateral chest image, the automatic exposure control is conducted solely on the X-ray dose detected in the area B, while outputs from the areas A and C are disregarded as they are out of the body of the object. Also in case the standard intensifying screens are replaced by both intensifying and compensating screens in the phototaking of a front chest image, there will result in under-exposure if the parameters of the automatic exposure control device remain unchanged, because the sensitivity compensating screens have a lower sensitivity in the lung lobe areas than in the mediastinum are in order to provide appropriate image densities in both areas. For obtaining an appropriate image density, therefore, the parameters have to be modified to avoid such under-exposure, and this can be attained by:

increasing the reference values for the areas A and C corresponding to the lung lobe areas of lower sensitivity; or weighting the value of outputs from the areas A, C, by reducing the gain of the outputs of said areas A, C for decreasing the input value into the integration.

Figure 10:
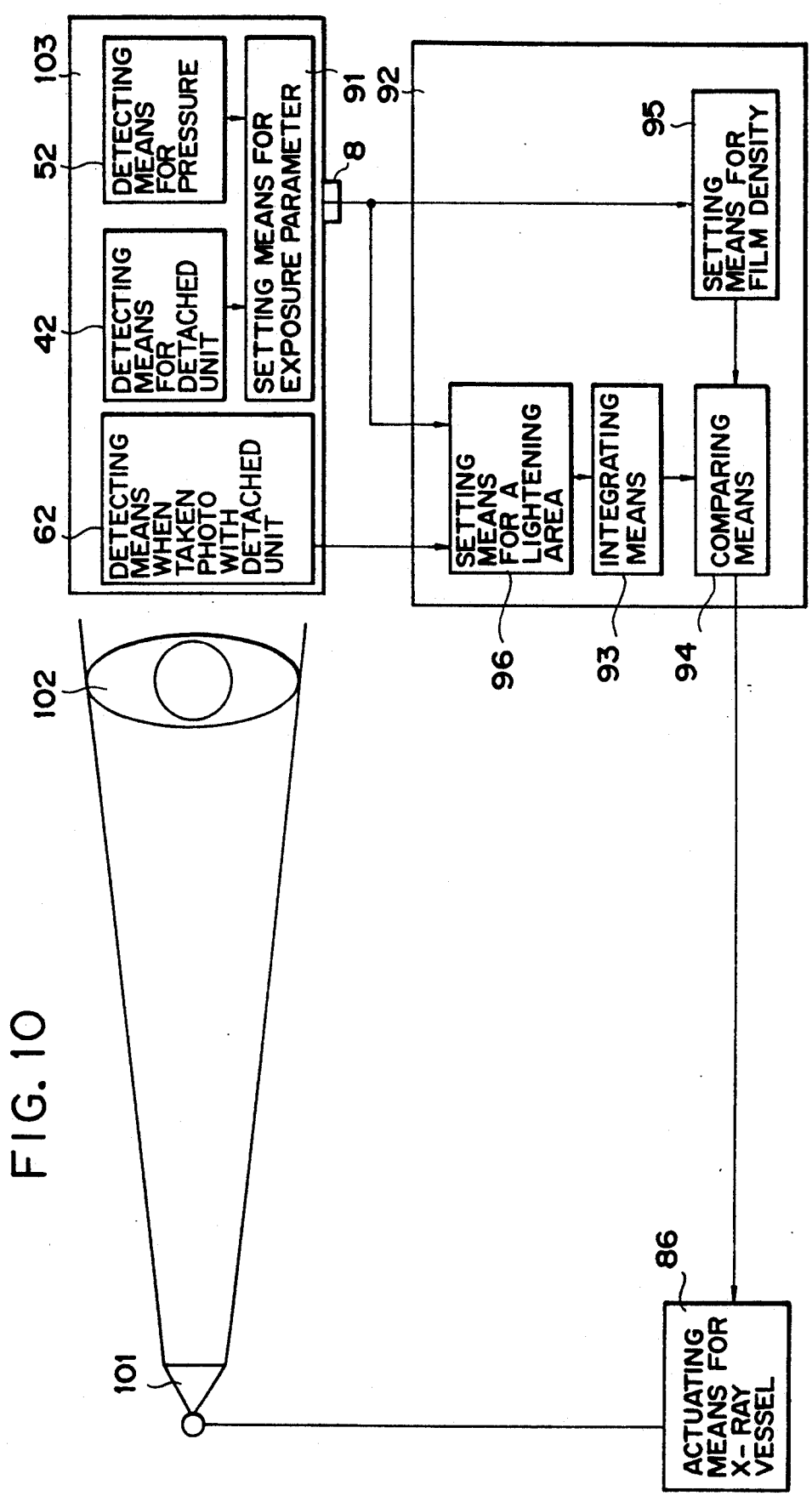
FIG. 10 is a view for explaining the parameter setting in the automatic exposure control device.

FIG. 10 shows the specific configuration for executing the above-explained exposure control. The detection means 42 detects kind of the detachable unit mounted on the phototaking apparatus while the detection means 52 detects the kinds of supply magazines, and a sheet film matching the intensifying screens is selected and fed to the phototaking part. Based on the detection signals, exposure parameter setting means 91 sets a reference value matching the combination of the intensifying screens and the sheet film, as explained above. It also sets parameters for the selection or weighting of outputs of the X-ray receiving areas, matching the combination. Corresponding set signals are outputted by output terminals 8, and the automatic exposure control device 92 connected thereto determines, based on said reference value, reference density value through film density setting means 95. It also sets parameters for the X-ray receiving areas by X-ray receiving area setting means 96. There are also shown an integrator 93 and a comparator 94.

When X-rays are directed from the X-ray tube 101 to the object 102 after the above-mentioned parameter setting of the automatic exposure control device, the detector 62 in the phototaking apparatus 103 detects the X-ray dose and converts it into electrical signals. Outputs of the positions set by the setting means 96 are integrated by the integrator 93 provided with a capacitor, and the accumulated charge therein represents the exposure of the film. The integrated value obtained in the integrator 93 is compared, in the comparator 94, with the reference value representing the appropriate exposure and determined in advance by the film density setting means 95 in the above-explained manner. When the integrated value reaches said reference value, the X-ray generating apparatus 86 is controlled to terminate the X-ray irradiation and thereby complete the phototaking operation. In this manner, the optimum exposure control can be achieved by exposure condition setting corresponding to the phototaking conditions.

In the above-explained embodiment, the operator identifies and mounts the appropriate contact unit, depending on the purpose, body part and positioning of phototaking, and also sets suitable supply magazines. A further preferred embodiment can be attained by storing, in advance, optimum programs of the intensifying screens, sheet film, grid, reference value and X-ray receiving areas of the automatic exposure control device and the irradiating conditions of the X-ray generating apparatus for each combination of the purpose, body part and positioning of phototaking.

Figure 12:
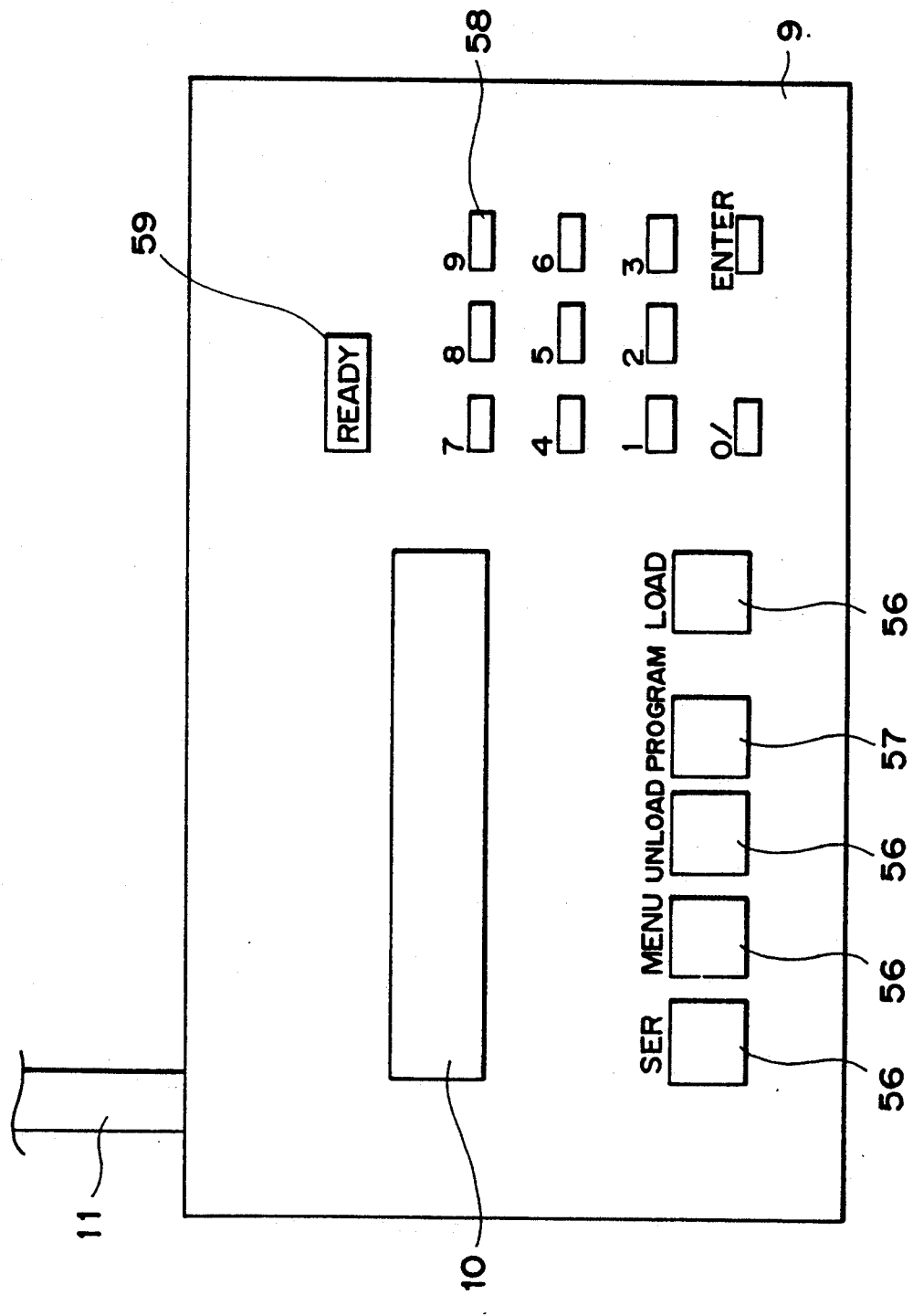
FIG. 12 is an external view of an operation unit in a second embodiment of the X-ray phototaking apparatus.
Figure 13:
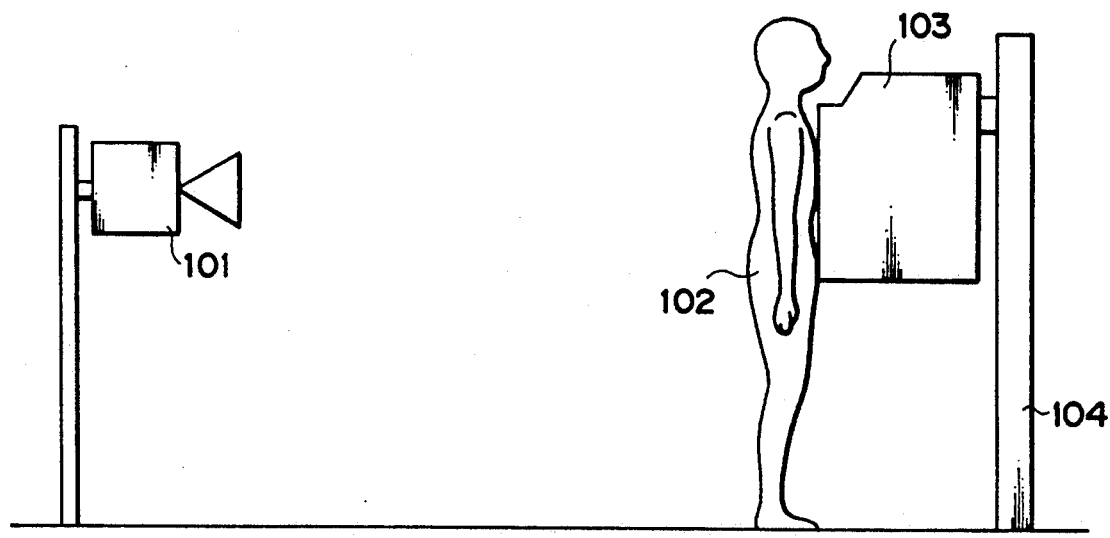
FIG. 13 is a schematic view of an X-ray phototaking system.
Figure 14:
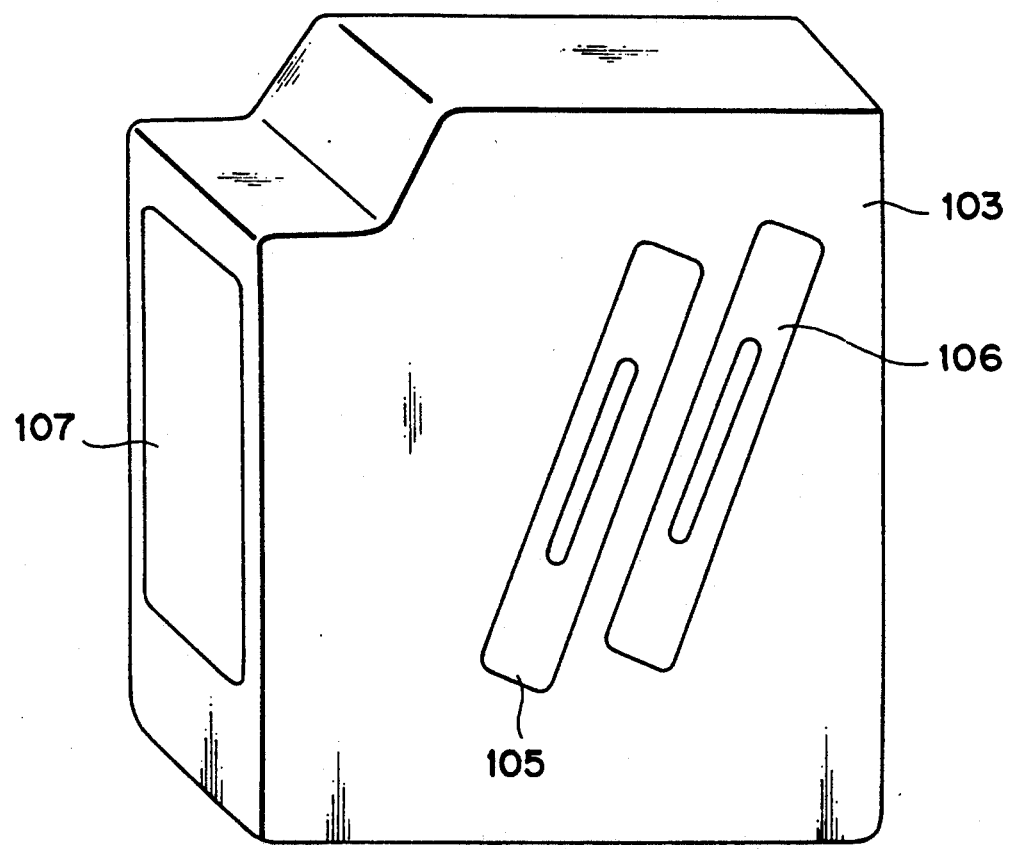
FIG. 14 is an external view of a conventional X-ray phototaking apparatus.
Figure 15:
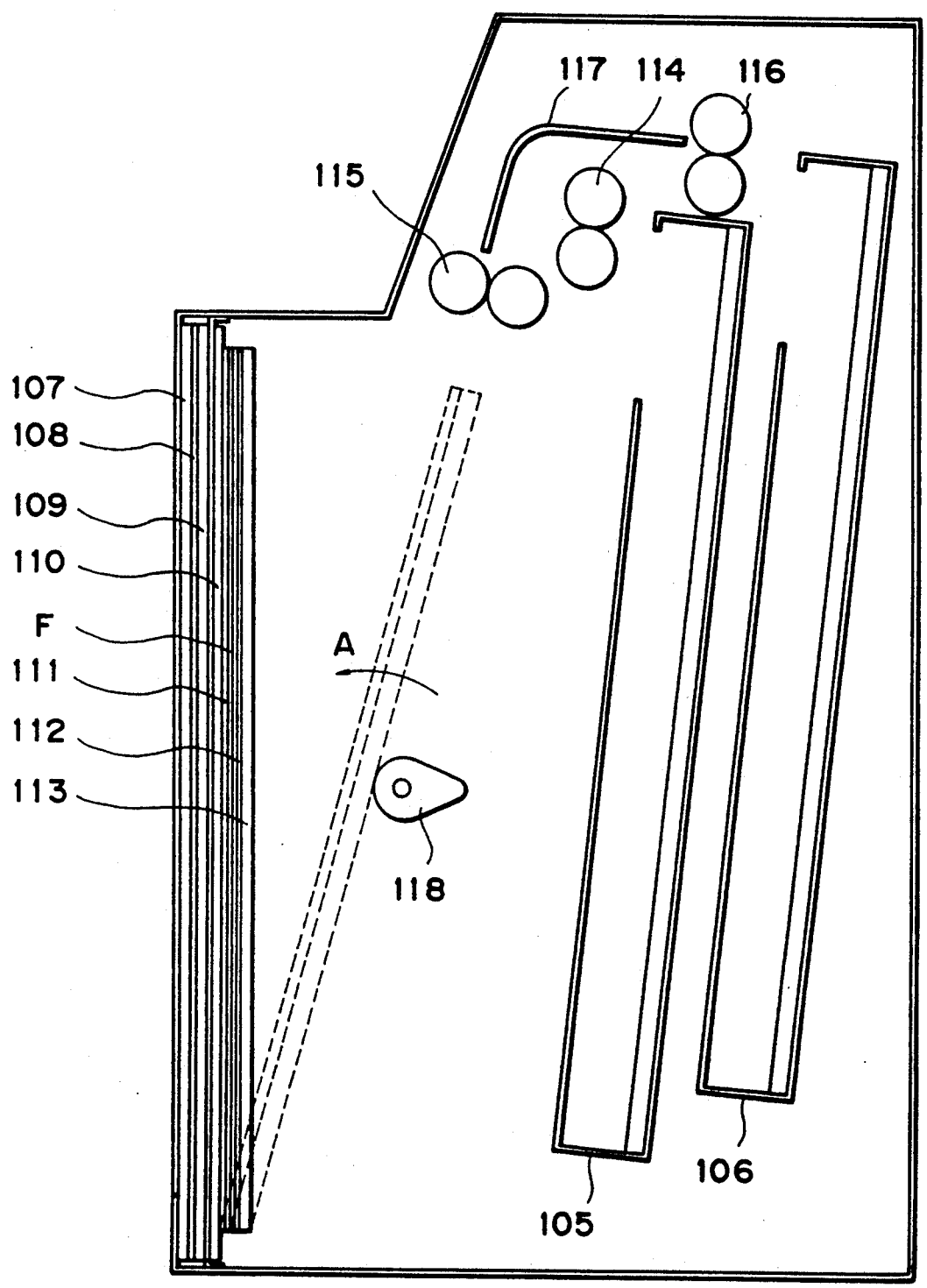
FIG. 15 is a view showing the internal structure of the conventional X-ray phototaking apparatus.

FIG. 12 shows an example of arrangement of the operating buttons on the operation unit 9 shown in FIG. 1, connected to the main body of the X-ray phototaking apparatus through a cable 11. There are provided a display unit 10, such as a liquid crystal display unit, for indicating the operation status of the phototaking apparatus; instruction switches 56 for said phototaking apparatus; a program call switch 57; numeral switches 58; and an indicator 59 to be turned on when the X-ray phototaking apparatus becomes ready for phototaking operation. Examples of the above-mentioned programmed combinations are shown in Table 3.

TABLE 3

| PURPOSE | CHEST SCREENING | CHEST PRECISE INSPECTION | ABDOMINAL PHOTOTAKING |
|---|---|---|---|
| PROGRAM NO. | 1 | 2 | 3 |
| INTENSIFYING SCREEN | 1: STANDARD | 2: HIGH SHARP | 3: HIGH SENS. |
| FILM | 1: STANDARD | 2: HIGH SHARP | 1: STANDARD |
| GRID | 1: CHEST | 1: CHEST | 2: ABDOMEN |
| CONTACT TIME | 1: 10 SEC. | 2: 20 SEC. | 1: 10 SEC. |
| REFERENCE VALUE | 1 | 2 | 3 |
| X-RAY RECEIV. AREA | 1: CHEST FRONT | 1: CHEST FRONT | 2: ABDOMEN |
| IRRAD. CONDITN | 1: 140 kVp | 1: 140 kVp | 2: 100 kVp |

For example, in case of chest precise inspection, there is selected the program number 2, by pressing the program call switch 57 and the numeral switch "2". In response the content of the program 2, shown in Table 3, is called from a memory and displayed on the display unit 10. According to the display, the operator mounts the contact unit 2, sheet film 2 and grid 1 on the phototaking apparatus. At the same time, the setting parameter of the automatic exposure control device, the irradiating condition of the X-ray generating apparatus and the output time of contacting completion signal which is the contact time are automatically set, corresponding to said program number 2.

The above-explained pre-programming of the phototaking conditions such as the intensifying screen, sheet film, parameter of the automatic exposure control device, irradiating conditions of the X-ray generating apparatus etc. for each purpose of phototaking, part and positioning of the body to be photographed allows easy selection of these conditions from complex combinations, and provides a very convenient system for the user.

In the X-ray phototaking apparatus explained above, the contact unit including the intensifying screens is rendered detachably mountable in the phototaking part, whereby plural intensifying screens can be utilized without increase in the dimension of the apparatus. It is therefore rendered possible to effect the X-ray phototaking by selecting an optimum screen for the part and positioning of the body to be photographed, from plural intensifying screens. Also since said X-ray phototaking apparatus can be constructed in substantially the same dimension as in the conventional apparatus, it is rendered possible to interchange the intensifying screens on an inspection wagon.

Also since the contact between the sheet film and the intensifying screens is executed by reduced pressure, the contacting unit can be made simpler in structure and lighter in weight, and the contact is made uniform over the entire area of the sheet film. Also since said contact is uniform among different contacting units, it is made possible to obtain X-ray photographs of high image quality in a stable manner.

Furthermore, depending on the kind of the screens in the contacting unit mounted in the phototaking part, there can be implemented an optimum combination of plural parameters such as the contact time, setting parameter of the automatic exposure control device, irradiating conditions of the X-ray generating apparatus and sheet film to be fed to the contacting unit, and cumbersome procedure resulting from the replacement of the intensifying screens can therefore be avoided. Consequently the operator can devote himself to his essential job such as correction of the positioning of the body of an object person.

In the foregoing embodiment, there has been explained the phototaking apparatus of a so-called two-channel type in which the sheet film matching the intensifying screens is selectively supplied from two supply magazines, but there may naturally be employed three or more channels. Also in a phototaking apparatus of one channel including only one supply magazine, it is also possible to detect the kinds of intensifying screens and the sheet film as in the foregoing embodiment, then to provide an alarm display and the like in case the sheet films in the mounted supply magazine do not match the intensifying screens and to effect the phototaking operation after a supply magazine piled up with matching sheet films is mounted.

Furthermore, though the foregoing embodiment shows a most preferred system in which the contact time, X-ray irradiating conditions and the exposure control parameters are modified according to the detection of the kinds of the detachable unit and of the sheet film, the present invention is not limited to such embodiment but can provide a significant effect in comparison with the conventional configuration if at least one condition is utilized in the detections and parameter modifications.

Thus, the present invention can provide an X-ray phototaking apparatus that can flexibly respond to various phototaking objectives.

What is claimed is:

1. An X-ray phototaking apparatus for effecting an X-ray phototaking operation by contacting a sheet film with intensifying members, comprising:
    a detachable unit containing intensifying members and detachably mountable on the main body of the phototaking apparatus:
    pressure reduction means for achieving said contact between the sheet film and said intensifying members by pressure reduction while said detachable unit is mounted; and
    detection means for detecting the kind of said mounted detachable unit.

2. An apparatus according to claim 1, further comprising means for varying the exposure conditions, based on detection signals of said detection means.

3. An apparatus according to claim 1, further comprising means for varying a contact time of the sheet film and said intensifying members, based on detection signals of said detection means.

4. An apparatus according to claim 1, further comprising means for varying X-ray irradiating conditions of the sheet film, based on detection signals of said detection means.

5. An X-ray phototaking apparatus for effecting an X-ray phototaking operation by contacting a sheet film, selected from sheet films or plural kinds, with intensifying members, comprising:
    storage means for storing sheet films of plural kinds in separate stacks;
    a detachable unit containing intensifying members and detachably mountable on the main body of the phototaking apparatus;
    pressure reduction means for achieving said contact between the sheet film and said intensifying members by pressure reduction while said detachable unit is mounted; and
    detection means for detecting the kind of the mounted detachable unit and the kind of the sheet films stored in said storage means.

6. An apparatus according to claim 5, further comprising means for varying X-ray irradiating conditions of the sheet film based on detection signals of said detection means.

7. An apparatus according to claim 5, further comprising means for varying the exposure conditions, based on detection signals of said detection.

8. An apparatus according to claim 5, further comprising means for selecting a sheet film matching said mounted intensifying members, based on detection signals of said detection means.

9. An apparatus according to claim 5, further comprising means for varying a contact time of the sheet film and said intensifying members, based on detection signals of said detection means.

10. An X-ray phototaking apparatus for effecting an X-ray phototaking operation by contacting a sheet film, selected from sheet films of plural kinds, with a intensifying member selected from intensifying members of plural kinds, comprising:
    means for detecting at least either of the kind of said intensifying member and the kind of said sheet film; and
    means for varying at least one of the contact time of said sheet film and said intensifying member, the X-ray irradiating conditions and the exposure conditions, based on detection signals obtained by said detection.

* * * * *

UNITED STATES PATENT AND TRADEMARK OFFICE
CERTIFICATE OF CORRECTION

PATENT NO. : 5,280,514
DATED : January 18, 1994
INVENTOR(S) : Tago et al.

It is certified that error appears in the above-indentified patent and that said Letters Patent is hereby corrected as shown below: On title page, item

[57] Abstract

Line 5, "of" (first occurrence) should be deleted.

COLUMN 1:

Line 7, "taking," should read --taking--.

COLUMN 8:

Line 16, "tile," should read --time,--.
Line 27, "from $t_l$," should read --from $t_1$--.
Line 58, "X-ray" should read --X-rays--.

COLUMN 11:

Line 4, "X-ray" should read --X-rays--.
Line 10, "(60/100)x$I_c$=40 is" should read --(60/100)x$I_c$=60, and--.
Line 11, "(40/100)x$I_c$40" should read --(40/100)x$I_c$=40--.
Line 18, "X-ray" should read --X-rays--.

COLUMN 12:

Line 31, "are" should be deleted.
Line 44, "kind of the" should read --the kinds of--.

COLUMN 15:

Line 14, "the" (first occurrence) should read --a--.
Line 15, "apparatus:" should read --apparatus;--.
Line 16, "said" should be deleted.
Line 20, "said" should be deleted.

UNITED STATES PATENT AND TRADEMARK OFFICE
CERTIFICATE OF CORRECTION

PATENT NO. : 5,280,514
DATED : January 18, 1994
INVENTOR(S) : Tago et al.

It is certified that error appears in the above-indentified patent and that said Letters Patent is hereby corrected as shown below:

Line 21, "mounted" should be deleted and "unit." should read --unit mounted on the main body.--.
Line 23, "the" should be deleted and "conditions," should read --conditions of the sheet film to X-rays,--.
Line 36, "sheet films or" should be deleted and "kinds" should read --kinds of sheet films--.
Line 38, "sheet films of" should be deleted and "kinds" should read --kinds of sheet films--.

COLUMN 16:

Line 2, "the" (first occurrence) should read --a--.
Line 4, "said" should be deleted.
Line 8, "the" (second occurrence) should be deleted.
Line 9, "mounted" should be deleted; "unit" should read --unit mounted on the main body-- and "the" (second occurrence) should be deleted.
Line 13, "film" should read --film,--.
Line 16, "the" should be deleted and "conditions," should read --conditions of the sheet film to X-rays,--.
Line 17, "detection." should read --detection means.--.
Line 28, "from" should read --from a plurality of different kinds of--; "films of plural kinds," should read --films,-- and "a" should read --an--.
Line 29, "from" should read --from a plurality of different kinds of-- and "members of" should read --members,--.
Line 30, "plural kinds," should be deleted.
Line 31, "of" (first occurrence) should be deleted and "said" should be deleted.
Line 32, "said" should be deleted.
Line 34, "the" should read --a--.
Line 35, "said" (first occurrence) should read --the-- and "the" should be deleted.

UNITED STATES PATENT AND TRADEMARK OFFICE
CERTIFICATE OF CORRECTION

PATENT NO. : 5,280,514
DATED : January 18, 1994
INVENTOR(S) : Tago et al.

It is certified that error appears in the above-indentified patent and that said Letters Patent is hereby corrected as shown below:

Line 36, "conditions" should read --conditions of the sheet film-- and "the" should be deleted.
Line 37, "ditions," should read --ditions of the sheet film to X-rays,--.
Line 38, "detection." should read --detection means--.

Signed and Sealed this

Eighteenth Day of October, 1994

Attest:

BRUCE LEHMAN

Attesting Officer

Commissioner of Patents and Trademarks